March 29, 1960  G. LUGLI ET AL  2,930,425
PNEUMATIC TIRE

Filed Dec. 5, 1955  3 Sheets-Sheet 1

INVENTORS
Giuseppe Lugli and
Carlo Mazza
BY Stevens, Davis, Miller and Mosher
ATTORNEYS March 29, 1960    G. LUGLI ET AL    2,930,425
PNEUMATIC TIRE Filed Dec. 5, 1955    3 Sheets-Sheet 2

INVENTORS
*Giuseppe Lugli* and
*Carlo Mazza*

BY *Stevens, Davis, Miller & Mosher*
ATTORNEYS

March 29, 1960  G. LUGLI ET AL  2,930,425
PNEUMATIC TIRE

Filed Dec. 5, 1955  3 Sheets-Sheet 3

INVENTORS
Giuseppe Lugli and
Carlo Mazza

BY *Stevens, Davis, Miller & Mosher*
ATTORNEYS

2,930,425

PNEUMATIC TIRE

Giuseppe Lugli and Carlo Mazza, Milan, Italy, assignors to Pirelli S.p.A., Milan, Italy Application December 5, 1955, Serial No. 551,132

Claims priority, application Italy December 6, 1954

7 Claims. (Cl. 152—354)

This invention relates to a pneumatic tire of special design which functions to achieve a reduction in tread wear.

Special types of pneumatic tires provided with strips extending along their whole peripheral development in the zone below the tread, which have been studied in order to obtain some improvement in comparison with the conventional tires normally in use with particular regard to the abrasion of the tread, have already been proposed.

The present invention has for an object to provide new types of structures, which also may help to achieve a certain reduction in the tread wear during running on rectilinear or curve paths and show particular advantages on irregular ground having an outstanding transversal curvature.

It is in fact known that the tread is worn owing to the creeping of the tire against the ground in the direction of running and perpendicularly to it, namely in the respectively called longitudinal and transversal directions.

The employment of superposed strips, the whole of which is able to oppose at the same time both the longitudinal and the transversal creeping, is already known. This is obtained by means of a strip assemblage which, besides withstanding the longitudinal stresses, opposes also the transversal ones.

Moreover, in order to provide the ring composed of the strips with further features of stiffness in both directions, in some typical cases rubber compounds having a high rigidity modulus have been employed, which are able to bind more closely the resistant elements of the ring itself.

Figure 1:
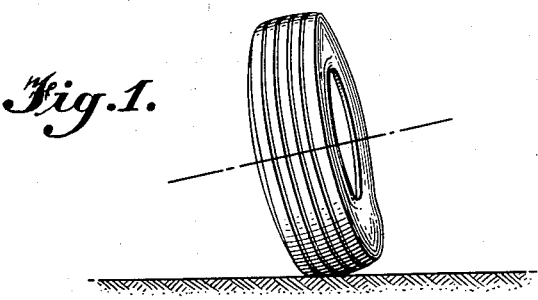

If this may be useful to reduce the creeping, it gives rise, however, to the inconvenience of causing in the ring in contact with the ground, especially during the running in curve, the geometrical position shown in Figure 1, that is the concentration of load on one side of the tread. This position causes a non-uniform distribution of the specific pressures on the tread, thus accentuating the wear of its edges. Similar concentrations of load and equal consequences may be noted on roads with sharp or remarkable transversal curvature and on irregular ground.

A greater, irregularly distributed abrasion is therefore caused in comparison with those obtainable with uniform load pressures.

The devices described in the following are able to reduce the longitudinal and transversal creeping, and do not give rise to the above-mentioned disadvantages and therefore are very useful for avoiding the causes of wear, thus assuring a better comfort.

In order to obtain this result, the assemblage of strips provided to reduce the longitudinal and transversal creeping is subdivided, both functionally and structurally, into two groups which hereafter will be referred to as group A and group B.

Group A.—This group is placed immediately below the tread and has the single function of withstanding the longitudinal creeping. It is disposed between the rubber tread and the carcass. Its strips must be characterized by a great resistance to the longitudinal stresses; they must therefore be formed of cords disposed in a direction equal or almost equal to that of said stresses and have to be obtained with materials having a high resistance to tension.

Said cords may be made of natural, artificial or synthetic textile material, or of a metallic material, the choice of the material being determined in accordance with the resulting loads and with the space available.

It is also advisable, in order to prevent the effects illustrated in Figure 1, that the rubber compounds or mixtures wherein said cords are embedded, have a low elasticity modulus in order to allow the deformations to which the tire is subjected to conform to the road surface.

For the above said reason, the width of said strips must be reduced and therefore has to be smaller (for instance by 20%) than the width of the tread.

By employing strips of this type a more uniform distribution of the specific loading pressures and a greater adaptability of the tire to the ground irregularities is obtained, with a consequent smaller wear of the tread and an increase in the comfort in running conditions.

In order to increase further said adaptability to the ground the group of strips A may be divided into a series of rings sufficiently distanced from one another; in this case the total width of the group may be greater than in the preceding case, without however exceeding the width of the tread.

Figure 2:
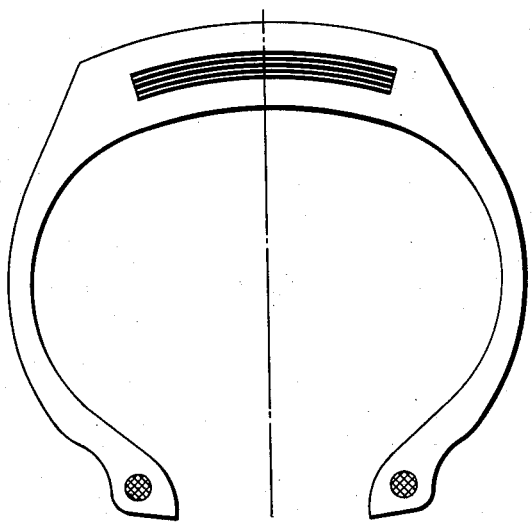
Figure 3:
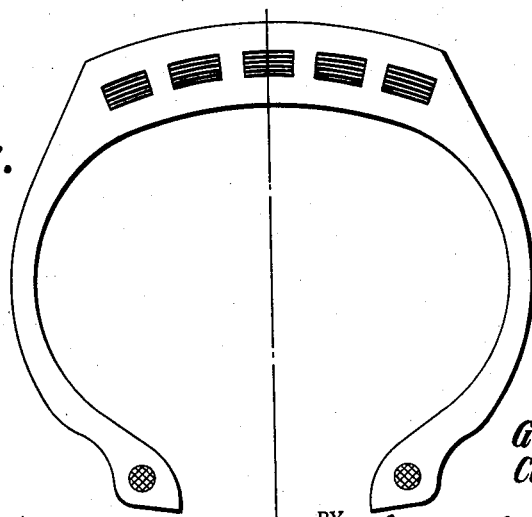

The two above described types of strips of group A are illustrated in Figures 2 and 3 which diagrammatically represent the cross section of the tire and respectively relate to the first and second type of strips.

Group B.—This group of strips is disposed between or below the carcass plies and has the task of withstanding the transversal creeping. The strips of group B must therefore be characterized by a great resistance to the transversal tension or traction stress.

The cords constituting said strips may be made of textile materials of various kinds, and may be different from those employed in the carcass, both for the material used and for the structure.

Moreover the width of the strips belonging to group B shall be greater than that of the strips of group A and also greater than the width of the tread; this is necessary since the resistance to the lateral stresses increases rapidly at the increase of the width of the strips.

It may be noted from the above, in connection with the groups of strips A and B, that the inventive principle of the invention forming the object of the present application is to separate the functions between the various parts of the tire. This allows an increase in the efficiency of said parts, since their realization is feasible in view of the particular task each has to carry out.

Figure 4:
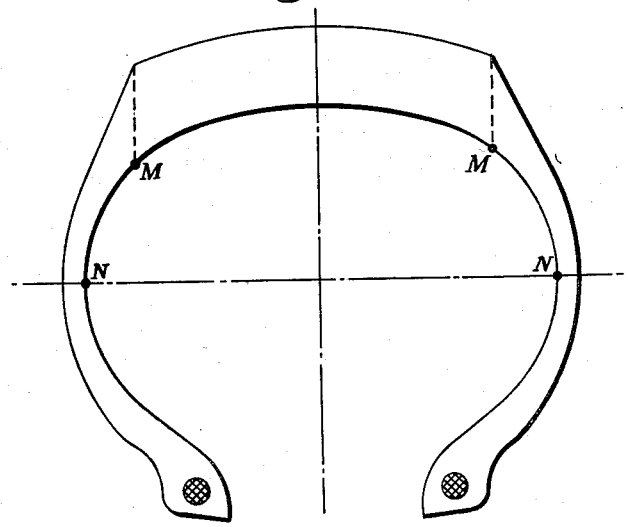

By maintaining unvaried the composition of the strips of group A in accordance with the above, new structures are proposed, as follows:

(a) made of a carcass composed of plies wherein the cords are practically disposed in planes passing through the axis of rotation and long enough to be wrapped about the metallic wires contained in the beads;

(b) made of pairs of strips of group B disposed between or below the carcass plies and consisting of cords of textile materials of different kind. As to the direction, the cords of the strips belonging to group B are symmetrically inclined with respect to the plane of symmetry of the tire normal to the axis of rotation, at an angle α (alpha) which may have a value ranging from 30° to 70°. As to the width, said strips extend symmetrically beyond the width of the tread, ending in a zone N included between the end of the tread M and the point of maximum transversal width N as indicated in Figure 4.

Figure 5:
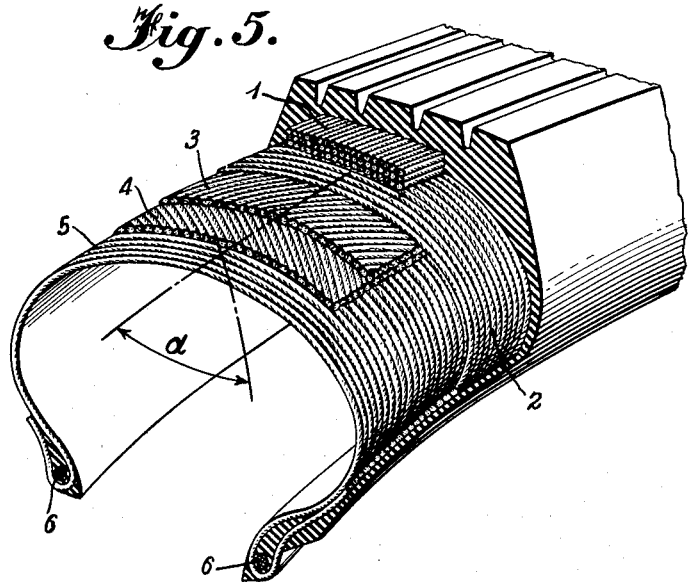

The geometrical disposition of the cords of the carcass plies and of the strips belonging to group B is indicated in Figure 5, which represents by way of example a portion of tire seen in perspective view.

In said representation the tire is provided with two carcass plies, indicated with 2 and 5, whose cords are practically lying in planes passing through the axis of rotation and which are then anchored to the metallic wires 6 contained in the beads; between said plies there are the above described strips 3 and 4 forming group B, whose cords are symmetrically inclined for an angle with respect to the plane of symmetry of the tire normal to the axis of rotation; 1 indicates the strips of group A lying on the carcass ply 2. In this case, by way of example, there are three superposed strips.

Another type of structure, which constitutes a particular object of the invention, is characterized in that the strips of group B, described in the preceding case, are eliminated, their function being committed to the carcass plies.

Said plies are in even number and the cords constituting them have a varying inclination in the hereunder mentioned various zones, namely: in the two portions extending from the bead to the tread, slightly exceeding the line corresponding to the maximum width of the tire, the cords are practically situated in planes passing through the axis of rotation of the tire; in the remaining portion the cords take, on the contrary, such a direction as to result symmetrically inclined for angles α (alpha) ranging from 30° to 70° with respect to the symmetry plane normal to the axis of rotation of the tire.

Figure 6:
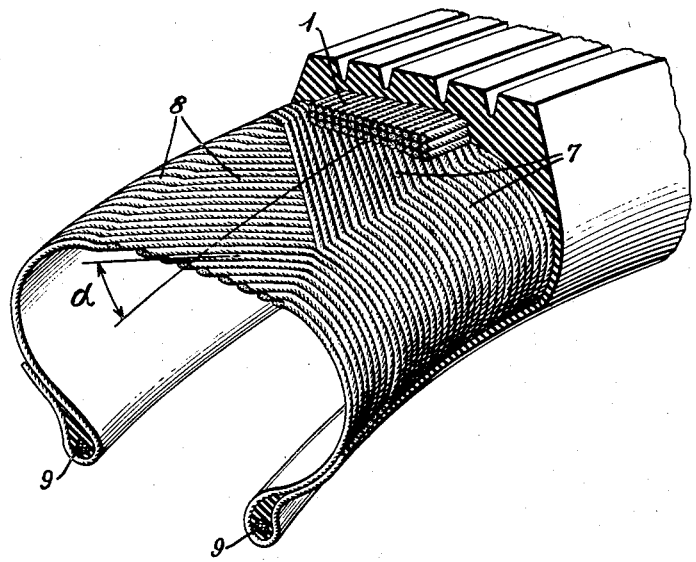

The geometrical disposition of said typical carcass plies is indicated in Figure 6 which represents, by way of example, a portion of tire seen in perspective view.

Said figure illustrates the two carcass plies 7 and 8, which are anchored to the metallic wires 9 contained in the beads; starting from the beads and slightly extending beyond the line of maximum width of the tire towards the tread, the cords constituting the plies are practically lying in planes passing through the axis of rotation of the tire. In the remaining portion the cords change direction meeting the plane of symmetry of the tire normal to the axis of rotation, at angles equal to α, in symmetrical directions.

Figure 7:
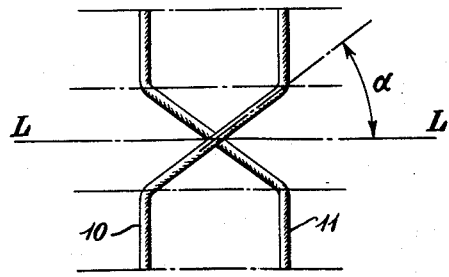

Figure 7 indicates for better clearness a sketch of the disposition of two cords 10 and 11 belonging respectively to the plies of even number illustrated in Figure 6; it represents therefore a portion of carcass developed in the plane of the drawing. The straight line L—L indicates the track of the symmetry plane of the tire.

This particular type of structure may be carried out also with plies made of metallic cords.

In all the forms of realization of the above-described tire, in order to protect against impacts and punctures the resistant structures existing in the zone corresponding to the tread, one or more layers of textile or metallic cords disposed in planes passing through the axis of rotation of the tire may be added to the above-indicated tire parts; said layers may be disposed above, below or between the strips of group A and their width will be generally greater than that of said strips.

Although the invention has been described with reference to preferred embodiments, nevertheless obvious changes are within the scope of the invention.

What is claimed is:

1. In a pneumatic tire for vehicle wheels, said tire including circular beads, a substantially toroidal-shaped carcass extending between said beads and a tread mounted on said carcass having a width less than that of said carcass, the combination of a ring shaped reinforcement comprising at least one strip of metal cords lying in planes substantially normal to the axis of rotation of the tire, said cords being embedded in a rubber compound having low rigidity, said ring-shaped reinforcement being disposed between the tread and the carcass and having a maximum width smaller than the width of the tread; and said carcass including at least two plies of cords going from bead to bead and lying, at least in the side zones of the tire between the beads and the tread, in radial planes passing through the axis of rotation of the tire, said carcass including also, in the central zone only of the tire, cords disposed at angles ranging between 30° and 70° with respect to the central plane of symmetry of the tire normal to the axis of rotation.

2. A pneumatic tire as claimed in claim 1 wherein the cords constituting the plies of the carcass are wholly lying in radial planes passing through the axis of rotation of the tire and the cords angularly inclined with respect to the plane of symmetry of the tire normal to the axis of rotation of the tire are constituted by strips of textile cords disposed between said radial plies, said strips extending across the whole peripheral development of the carcass and having a width greater than that of the tread but not, however, reaching the area of maximum width of the tire.

3. A pneumatic tire as claimed in claim 2 wherein the cords of the radial plies are constituted of textile material.

4. A pneumatic tire as claimed in claim 2 wherein the cords of the radial plies are constituted of metallic material.

5. A pneumatic tire as claimed in claim 1 wherein the plies of the carcass are even in number and the cords constituting said plies have a different inclination in the various zones, namely, in the two side zones from the beads to the tread, which extend towards the tread slightly beyond the line corresponding to the maximum width of the tire, the cords in these two side zones being disposed in radial planes passing through the axis of rotation of the tire, while in the remaining central zone of the tire beneath the tread portion, said plies are constituted by said cords which are inclined symmetrically at angles ranging from 30° to 70° with respect to the plane of symmetry normal to the axis of rotation of the tire.

6. A pneumatic tire as claimed in claim 5 wherein the cords of the plies of the carcass are constituted of textile material.

7. A pneumatic tire as claimed in claim 5 wherein the cords of the plies of the carcass are constituted of metallic material.

References Cited in the file of this patent

UNITED STATES PATENTS

| 1,165,631 | Seward | Dec. 28, 1915 |
| 1,818,950 | Handy | Aug. 11, 1931 |
| 2,186,178 | Shoemaker | Jan. 9, 1940 |
| 2,493,614 | Bourdon | Jan. 3, 1950 |
| 2,541,506 | Cuthbertson et al. | Feb. 13, 1951 |
| 2,703,128 | Darrow | Mar. 1, 1955 |

FOREIGN PATENTS

| 11,179 | France | Oct. 28, 1909 |
| | (1st addition to Patent No. 394,987) | |
| 522,301 | Belgium | Sept. 15, 1953 |